United States Patent
Pinewski

[19]

[11] Patent Number: 6,023,136
[45] Date of Patent: Feb. 8, 2000

[54] ADAPTIVE MOTOR CONTROL CIRCUIT AND METHOD

[75] Inventor: Peter J. Pinewski, Chandler, Ariz.

[73] Assignee: Motorola, Inc., Schaumburg, Ill.

[21] Appl. No.: 08/980,422

[22] Filed: Nov. 28, 1997

[51] Int. Cl.$^7$ .................................................. H02K 23/00
[52] U.S. Cl. ........................... 318/254; 318/138; 318/439
[58] Field of Search ........................... 318/138, 245–293, 318/600–610, 439, 800–832; 388/805, 802, 803, 812

[56] References Cited

U.S. PATENT DOCUMENTS

| | | | |
|---|---|---|---|
| 4,291,265 | 9/1981 | Kawada et al. | 318/782 |
| 4,314,191 | 2/1982 | Kawada et al. | 318/802 |
| 4,727,468 | 2/1988 | Maekawa | 363/41 |
| 5,264,775 | 11/1993 | Namuduri et al. | 318/811 |
| 5,309,079 | 5/1994 | Takada | 318/811 |
| 5,317,243 | 5/1994 | Cameron | 318/254 |
| 5,334,917 | 8/1994 | Lind | 318/254 |
| 5,350,988 | 9/1994 | Le | 318/618 |
| 5,463,299 | 10/1995 | Futami et al. | 318/618 |
| 5,486,743 | 1/1996 | Nagai | 318/439 |
| 5,491,622 | 2/1996 | Carosa . | |
| 5,572,097 | 11/1996 | Cameron | 318/254 |
| 5,631,999 | 5/1997 | Dinsmore | 388/805 |

OTHER PUBLICATIONS

"The Microprocessor Based Modifised Space Vector Control Of The Matrix Converter", E.M. Chekhet et al., Institute of Electrodynamics of the Unkrainian National Academy of Sciences, Kiev, Ukraine.

"Power Losses For Space Vector Modulation Techniques", Perruchoud et al., 1996 IEEE, 0–7803–3292–X/96, pp. 167–173.

"Space Vector Fourier Analysis Of SVM Inverters In The Overmodulation Range", s. Bolognani et al., IEEE, 0–7803–2795–0, pp. 319–324.

"Space Vector Modulated matrix Converter With Minimized Number Of Switchings And a Feedforward Compensation Of Input Voltage Unbalance", P. Nielsen et al, IEEE, 0–7803–2795, pp. 833–839.

"A Novel Digital Control For Active Power Filter", E. H. Song et al., IEEE, 0–7803–0582–5/92, pp. 1168–1173.

P. Pinewski, EDN Products Edition, "Understanding Space Vector Modulation", Mar. 7, 1996, pp. 45–46.

G. Ledwich, IEEE Transactions on Power Electronics, "Current Source Inverter Modulation", vol. 6, No. 4, Oct. 1991, pp. 618–623.

S. Fukuda et al., IEEE Transactions on Power Electronics, "PWM Technique for Inverter with Sinusoidal Output Current", vol. 5, No. 1, Jan. 1990, pp. 54–61.

*Primary Examiner*—Paul Ip
*Attorney, Agent, or Firm*—Anthony M. Martinez

[57] ABSTRACT

An electric motor (101) is driven with a sequence of drive pulses ($V_{151}$, $V_{153}$, $V_{155}$) applied to its coils (131–135). The drive pulse widths are computed over a series of time periods ($T_{DRIVE}$) by a pulse generator (119) to form envelopes approximating the phase voltages ($VE_{151}$, $VE_{153}$, $VE_{155}$) of the coils to produce sinusoidal coil currents ($I_{131}$, $I_{133}$, $I_{135}$). A sensing circuit (137, 123) monitors the phase of the coil current with respect to phase voltage to compute a representative control signal (CONTROL). The phase has one polarity when the motor is delivering power from a battery to a load and the opposite polarity when power is delivered from the load to the battery. When the direction of transferred power changes, the control signal changes and the pulse generator switches on-the-fly to another sequence of drive pulses.

15 Claims, 3 Drawing Sheets

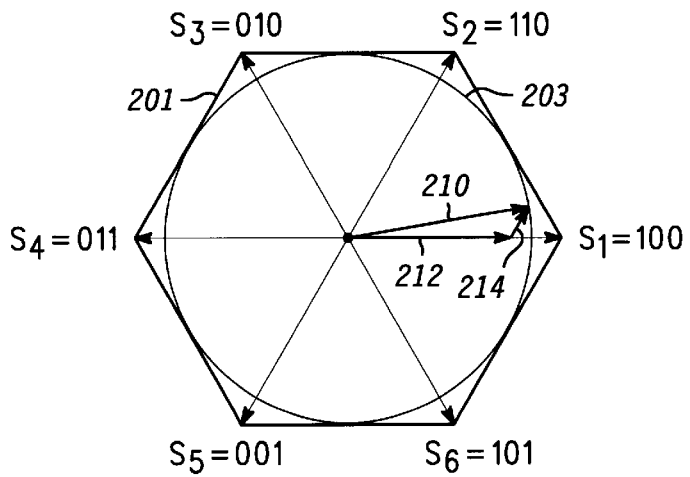
FIG. 4
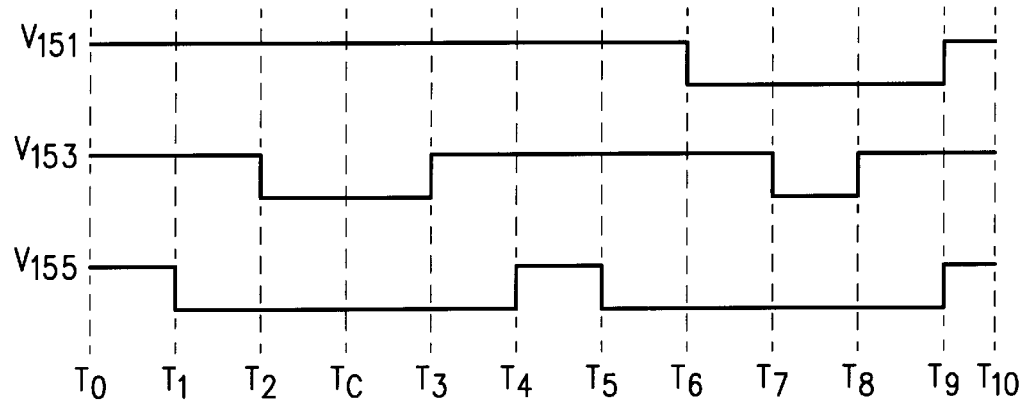
FIG. 5
FIG. 6
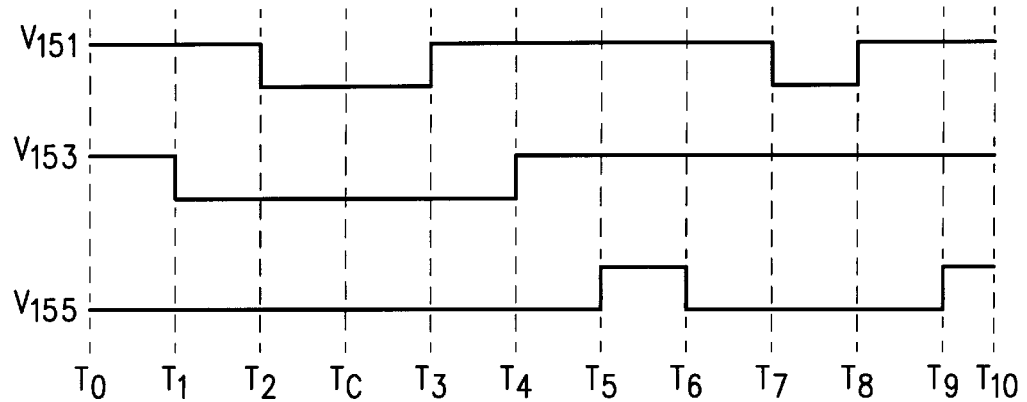

ADAPTIVE MOTOR CONTROL CIRCUIT AND METHOD

BACKGROUND OF THE INVENTION

The present invention relates in general to motor drive circuits and, more particularly, to circuits for driving electric motors with variable pulse width drive signals.

Electric motors currently are being used in a wide variety of consumer and industrial applications. For example, automobile manufacturers are using electric motors to replace combustion engines in motor vehicles. Such motors often are induction type electric motors in which the field windings consist of three coils connected to a common central node. The other ends of the coils are driven by three phase voltages mutually separated in phase by 120°. The phase voltages produce sinusoidal currents in the field coils for driving the motor.

Since automobile electric motors operate from a battery, it is important that they operate efficiently in order to minimize battery consumption and recharging. Consequently, most motor drive circuits use voltage pulses to drive the coils rather than phase voltage waveforms. The drive pulses are generated in an ordered sequence with variable pulse widths to produce an envelope whose shape approximates that of the desired phase voltages.

A number of schemes are in use for generating such motor drive pulse sequences. For example, with standard pulse width modulation (PWM), pulses are computed for each coil independently and the coils are driven with sinusoidal phase voltages. However, PWM fixes the central node at a constant potential, which reduces the maximum power available to drive the motor. Another scheme, space vector modulation (SVM), treats the coil drive pulses as a unit, which increases maximum power by allowing the central node to vary in potential. Such prior art schemes often can be selected to optimize the performance of a motor under one set of conditions. However, the performance deteriorates when the conditions change.

For example, it is desirable to use electric motors in automobiles to extend operating time by recharging the battery when the vehicle is decelerating using kinetic energy stored in the vehicle's mass. Hence, during motoring, the electric motor delivers energy to propel the vehicle, whereas during regeneration, the motor functions as a generator to transfer energy back to the battery. Prior art schemes which minimize power consumption during motoring suffer from low efficiency during regeneration, and vice versa.

Hence, there is a need for a circuit and method of adapting a motor drive system to changing conditions to maintain a high overall efficiency.

BRIEF DESCRIPTION OF THE DRAWINGS

FIG. 4 is a vector state diagram of a motor drive vector computed from base vectors;

FIG. 5 is a timing diagram showing a portion of one sequence of drive pulses; and FIG. 6 is a timing diagram showing a portion of another sequence of drive pulses.

DETAILED DESCRIPTION OF THE DRAWINGS

Figure 1:
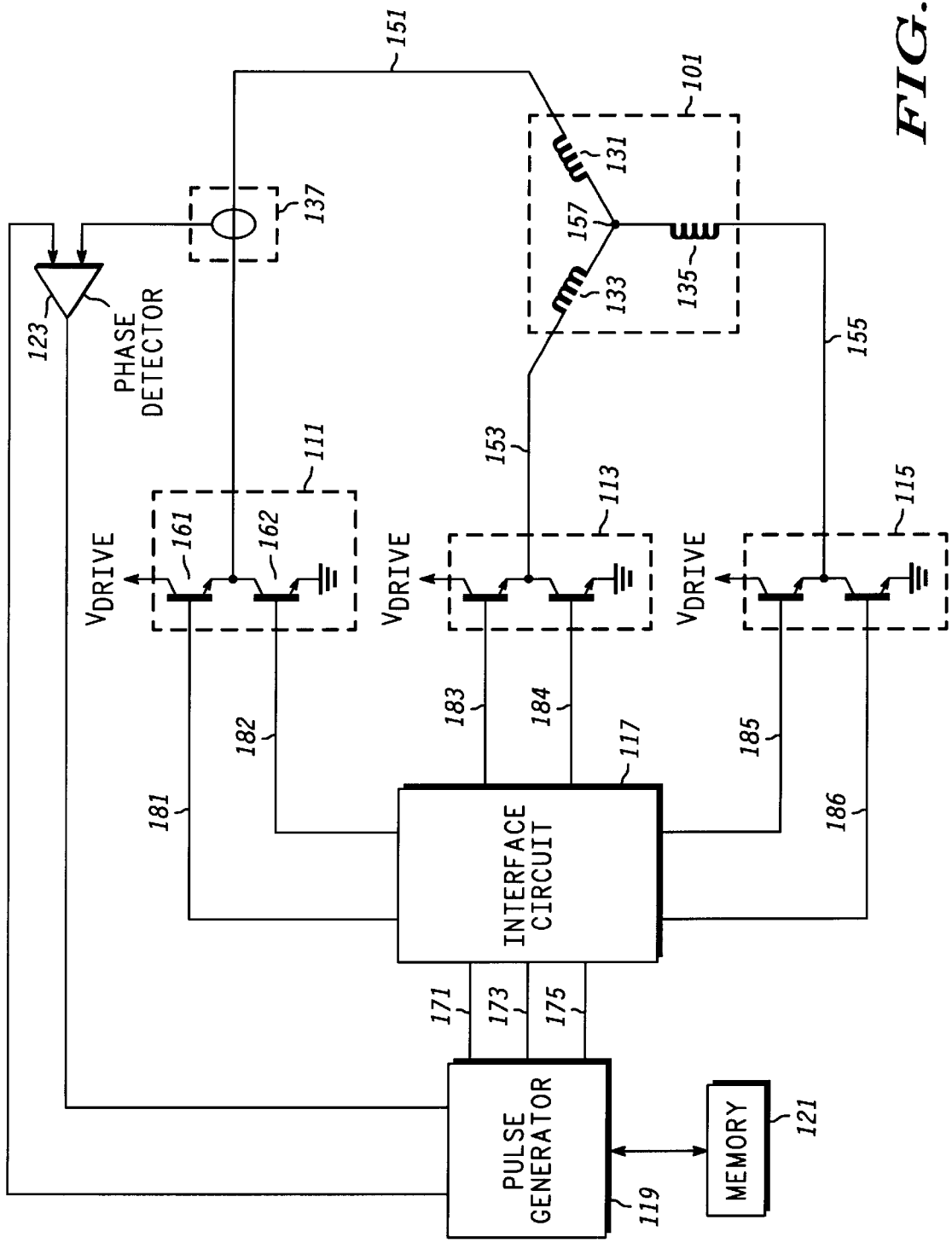
FIG. 1 is a schematic diagram of an electric motor and associated drive circuitry.

FIG. 1 is a schematic diagram of an electric motor 101 and its associated drive circuitry configured for use in a motor vehicle, including coil drivers 111, 113 and 115, an interface circuit 117, a pulse generator 119, a memory circuit 121, a phase detector 123 and a sensor 137. A battery (not shown) supplies a voltage $V_{DRIVE}=300.0$ volts for driving motor 101.

Electric motor 101 is shown as a three-phase motor having coils 131, 133 and 135 oriented at 0°, 120° and 240° angles within motor 101 and electrically coupled to a central node 157 as shown. Coils 131–135 are respectively driven at nodes 151, 153 and 155 with drive pulse signals $V_{151}$, $V_{153}$ and $V_{155}$ from the outputs of coil drivers 111–115. The pulses of $V_{151}$–$V_{155}$ have variable widths whose average duty cycles form envelopes that approximate the desired phase voltages at nodes 151–155. For convenience, these envelopes at nodes 151–155 are designated as $VE_{151}$, $VE_{153}$ and $VE_{155}$, respectively.

In response to $V_{151}$–$V_{155}$, currents $I_{131}$, $I_{133}$ and $I_{135}$ flow from the $V_{DRIVE}$ conductor through coils 131–135 to generate an electromagnetic force that drives a rotor (not shown) of motor 101 to propel the vehicle. When the vehicle decelerates, the process reverses, and motor 101 operates as a generator. Kinetic energy stored in the vehicle's mass induces currents $I_{131}$–$I_{135}$ in coils 131–135 which flows back through drivers 111–115 to the battery. The power factor of motor 101 is set by the phases of $I_{131}$–$I_{135}$, which lag $VE_{151}$–$VE_{155}$ in phase during motoring, i.e., when motor 101 delivers energy to the vehicle, and undergo an inversion in polarity so as to effectively lead in phase during regeneration, i.e., when motor 101 is receiving energy from the vehicle.

The sequences of drive pulses are computed by pulse generator 119, which comprises a microcontroller or similar circuit that operates by implementing software instructions stored in memory 121 as described below. Pulse generator 119 computes one sequence during motoring operation and switches to another sequence while regenerating. The sequence being computed at any time is determined by a CONTROL signal produced by phase detector 123 to indicate the coil current phase.

Sensor 137 is disposed in motor 101 and includes an inductive pickup coil electromagnetically coupled for sensing $I_{131}$ flowing through coil 131. As shown in the figure, the reference direction of $I_{131}$ is out of the motor. Some applications use additional sensors to sense $I_{133}$ and $I_{135}$ as well. In an alternative embodiment, the phases of coil currents are determined from the rotor frequency with other types of sensors, such as optical sensing devices or Hall effect devices which produce sense pulses as the rotor passes. In addition, other physical states besides coil current, such as temperature, can be monitored and used to control motor 101. For example, temperature can be sensed with a thermocouple to produce a control signal to cause pulse generator 119 to switch to an idling drive pulse sequence if an elevated temperature is present. The present invention has a high degree of flexibility in improving the efficiency and reliability of motor 101 by monitoring such physical states and switching to an optimum drive pulse sequence when conditions warrant.

Pulse generator 119 computes $V_{151}$–$V_{155}$ pulse widths from data stored in memory 121 which is indicative of the phase of $VE_{151}$ as described below. This phase data is applied to an input of phase detector 123 along with the sense signal from sensor 137 to produce CONTROL having one value when $I_{131}$ effectively leads $VE_{151}$ in phase and another value when $I_{131}$ lags $VE_{151}$ in phase.

Drivers 111–115 include high-current switching transistors 161–162 arranged in a totem pole to switch coils 131–135 between battery voltage $V_{DRIVE}$=300.0 volts and ground. In the embodiment of FIG. 1, transistors 161–162 are insulated gate bipolar transistors, so that the drive voltages applied to their respective gates are of opposite polarity to ensure that transistors 161–162 are not turned on at the same time. Alternatively, other types of semiconductor devices can be used by appropriately modifying interface circuit 117. That is, when the voltage on output 171 of pulse generator 119 is logic high, the drive at node 181 is high while the drive on node 182 is low, or vice versa. A similar relationship exists between outputs 173 and 175 and nodes 183–184 and 185–186. Alternative configurations are known and can be used to implement drivers 111–115.

Interface circuit 117 operates as a level shifter for converting pulses from pulse generator 119, operating from supply $V_{CC}$=5.0 volts, to the levels needed for driving transistors 161–162 of drivers 111–115, which operate from battery voltage $V_{DRIVE}$=300.0 volts.

Phase detector 123 is configured as a multiplier or other detection circuit which produces CONTROL at its output. When the phase changes polarity to indicate a change in power factor, CONTROL is applied to pulse generator 119 to switch "on-the-fly" from one sequence of drive pulses to another sequence optimized for the changed condition. This feature of the present invention which allows the system to adapt to changing conditions improves on prior art motor drive systems, which are limited to a single, fixed sequence of drive pulses.

Pulse generator 119 produces a $V_{151}$–$V_{155}$ drive pulse in each time period designated as $T_{DRIVE}$. For example, to drive a motor rotating at 60.0 hertz (3,600 rotations per minute), drive pulses may be generated at a rate of 7,200 hertz to produce 120.0 time periods per rotation, so that $T_{DRIVE}$=138.9 microseconds. The period of $T_{DRIVE}$ changes at the same rate as the motor speed, so each $T_{DRIVE}$ time period advances the phase by $360°/120=3°$ at any speed of motor 101. $V_{151}$–$V_{155}$ pulse widths are computed for each $T_{DRIVE}$ to produce the desired phase.

Power dissipation during switching transitions depends not only on the battery voltage $V_{DRIVE}$, but also on the amount of coil current being switched by a driver. Hence, power consumption can be reduced by reducing the overall number of switching transitions and by switching coils while they are conducting lower currents. For example, if $I_{131}$ is split at central node 157 to produce $I_{133}=I_{135}=I_{131}/2$, then less power is consumed if $I_{133}$ or $I_{135}$ are commutated rather than $I_{131}$.

Figure 2:
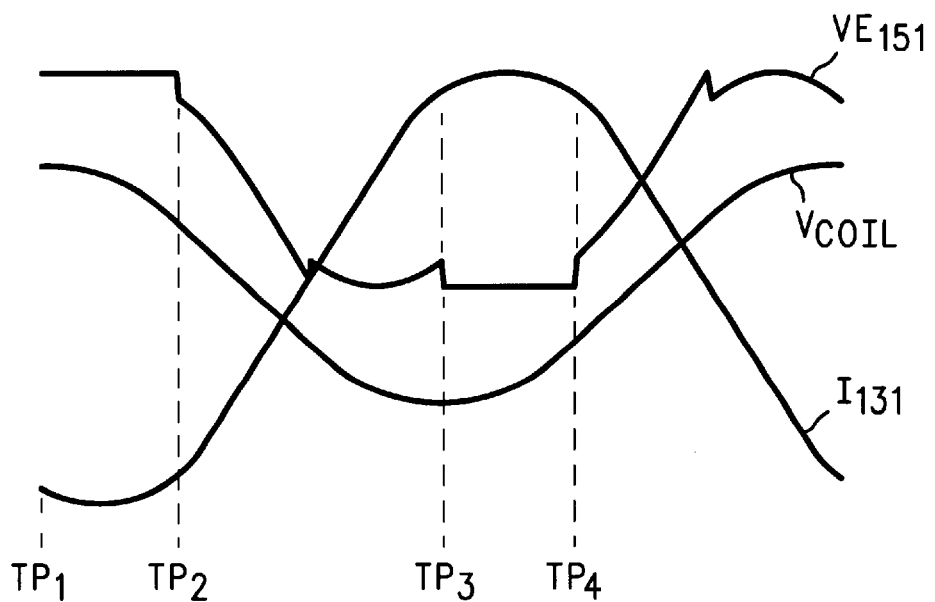
FIG. 2 is a graph of waveforms of a coil during motoring.

FIG. 2 shows normalized representative waveforms of $I_{131}$ and $VE_{151}$ while motor 101 is motoring. $VE_{151}$ is measured from node 151 to ground and is produced by a sequence of variable width drive pulses referred to as an alternating $S_7$ null sequence described in detail below. Note that $VE_{151}$ is not a sine wave due to fluctuations in the potential of central node 157. However, $I_{131}$ is substantially sinusoidal, as is the voltage $V_{COIL}$ across coil 131, i.e., from node 151 to 157. The phase of $I_{131}$ lags that of $VE_{151}$. Similar waveforms can be obtained for $VE_{153}$ and $VE_{155}$ at nodes 153 and 155 and currents $I_{133}$ and $I_{135}$ through coils 133 and 135.

The alternating $S_7$ null sequence is used to provide not only a low overall amount of switching, but also to avoid switching coils while peak current is flowing through them. As shown in the figure, $I_{131}$ reaches peak levels during the interval $TP_1$–$TP_2$ while $VE_{151}=V_{DRIVE}$ remains at a constant voltage. Consequently, pulse generator 119 produces a pulse at output 171 which remains at logic high throughout $TP_1$–$TP_2$ to keep transistor 162 turned off and transistor 161 turned on. Similarly, in the interval $TP_3$–$TP_4$, $I_{131}$ reaches a peak level while $VE_{151}$=0.0 volts remains constant, so pulse generator 119 produces a pulse at output 171 which remains at logic low throughout $TP_3$–$TP_4$ to keep transistor 161 turned off and transistor 162 turned on. Hence, transistors 161–162 are not switched when $I_{131}$ is high, thereby substantially reduced transient power.

Figure 3:
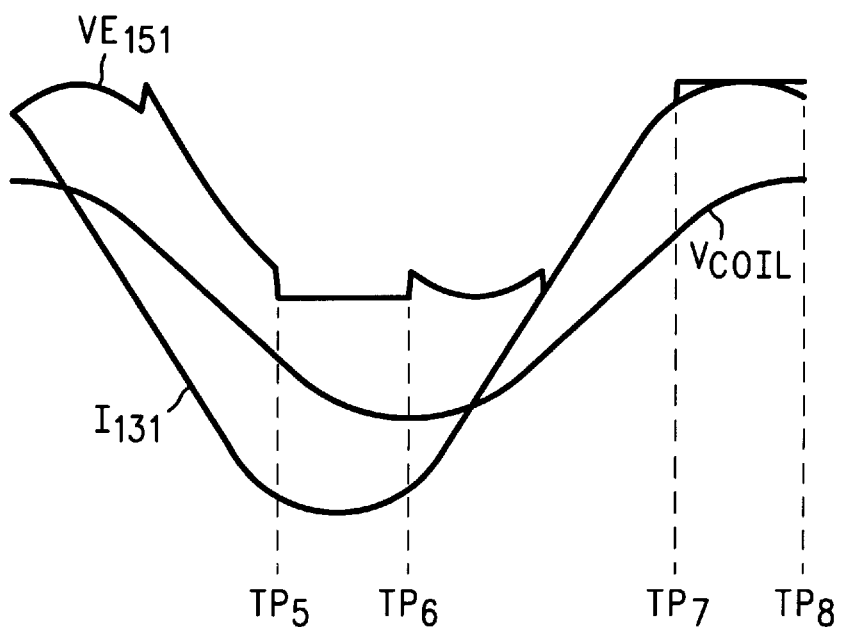
FIG. 3 is a graph of waveforms of a coil during regeneration.

FIG. 3 is a similar graph of $I_{113}$ and $VE_{151}$ but while motor 101 is regenerating. $VE_{151}$ is produced by a sequence referred to as an alternating $S_0$ null sequence described below. Note that the phase angle of $I_{131}$ leads that of $VE_{151}$. Phase voltages $VE_{153}$ and $VE_{155}$ and currents $I_{133}$ and $I_{135}$ have similar waveforms. As is the case during motoring, $VE_{151}$ is not sinusoidal, whereas both $I_{131}$ and $V_{COIL}$ are sinusoidal.

The alternating $S_0$ null sequence is a mirror image of the alternating $S_7$ null sequence. Therefore, the intervals where $VE_{151}$ remains constant are different, so that a shift in the peak levels of $I_{131}$ caused by a change in power factor can coincide with the interval where $VE_{151}$=0.0 volts is constant. Transistor 161 remains turned off while transistor 162 remains turned on. Similarly, in the interval $TP_7$–$TP_8$, $I_{131}$ reaches a peak level while $VE_{151}=V_{DRIVE}$ remains constant, so transistor 162 remains turned off and transistor 161 remains turned on.

The alternating $S_0$ and $S_7$ null sequences are computed using a space vector modulation (SVM) technique. Briefly, each of the nodes 151–155 has two possible states, either $V_{DRIVE}$ (logic high or "1") or ground potential (logic low or "0"). The $2^3$=8 possible voltage combinations which can appear at nodes 151–155 are designated as base vectors $S_0$–$S_7$ and listed in Table 1 below.

TABLE 1

| Base Vector | Node 151 | Node 153 | Node 155 | Phase Angle |
|---|---|---|---|---|
| $S_0$ = 000 | Ground | Ground | Ground | Null |
| $S_1$ = 100 | $V_{DRIVE}$ | Ground | Ground | 0° |
| $S_2$ = 110 | $V_{DRIVE}$ | $V_{DRIVE}$ | Ground | 60° |
| $S_3$ = 010 | Ground | $V_{DRIVE}$ | Ground | 120° |
| $S_4$ = 011 | Ground | $V_{DRIVE}$ | $V_{DRIVE}$ | 180° |
| $S_5$ = 001 | Ground | Ground | $V_{DRIVE}$ | 240° |
| $S_6$ = 101 | $V_{DRIVE}$ | Ground | $V_{DRIVE}$ | 300° |
| $S_7$ = 111 | $V_{DRIVE}$ | $V_{DRIVE}$ | $V_{DRIVE}$ | Null |

For example, base vector $S_1$ (100) indicates that pulse generator 119 produces a logic high pulse at output 171 and logic low pulses at outputs 173 and 175. Interface circuit 117 combines with drivers 111–115 to drive node 151 to $V_{DRIVE}$ and nodes 153–155 to ground. Hence, $I_{131}$ splits at central node 157 and flows equally as $I_{133}$ and $I_{135}$ though coils 133 and 135. The higher current through coil 131 tends to orient the rotor of motor 101 to the 0° angle of coil 131. Conversely, base vector $S_4$ (011) drives node 151 to ground and nodes 153–155 to $V_{DRIVE}$. $I_{131}$ has the opposite polarity, again flowing equally through coils 133 and 135 to orient the rotor of motor 101 to an angle opposite to coil 131, or 180° as shown in Table 1. In a similar fashion, the other base vectors produce magnetic fields which tend to orient the rotor to angles indicated in the last column of Table 1. A combination of base vectors is generated within a time period $T_{DRIVE}$ to drive motor 101 to other phase angles.

The two "null" vectors, $S_0$ and $S_7$, do not cause current to flow through coils 131–135. Null vector $S_0$ (000) drives nodes 151–155 to ground potential, so that $I_{131}=I_{133}=I_{135}=$ 0.0. Similarly, null vector $S_7$ (111) drives nodes 151–155 to $V_{DRIVE}$, so that $I_{131}=I_{133}=I_{135}=0.0$. Hence, null vectors $S_0$ and $S_7$ do not affect the angle of the rotor. However, the null vector chosen can determine the amount of switching in drivers 111–115, and therefore the power dissipated.

FIG. 4 is a vector state diagram showing graphically how SVM is used to compute drive pulses for an angle $\Phi$ from base vectors $S_0$–$S_7$. Base vectors $S_1$–$S_6$ define 60° regions or sectors of a cycle of motor 101, with their tips lying at the corners of a regular hexagon 201 as shown. Vector 210 is directed at an angle $\Phi$ between adjacent base vectors $S_1$ and $S_2$. The distance from the center of circle 203 to the perimeter of hexagon 201 represents time period $T_{DRIVE}$.

Vector 210 is resolved into component vectors 212 and 214 of base vectors $S_1$ and $S_2$ whose lengths represent pulse widths $T_{S1}$ and $T_{S2}$ within $T_{DRIVE}$. When $T_{S1}+T_{S2}<T_{DRIVE}$, a null vector, either $S_0$ or $S_7$, is generated for the remainder of $T_{DRIVE}$, which allows pulse generator 119 to compute drive pulses at fixed phase increments. Hence, vector 210 is generated by generating $S_1$ with a pulse width $T_{S1}$, $S_2$ with a pulse width $T_{S2}$ and a null vector ($S_0$ or $S_7$) for the remaining period $T_{DRIVE}-(T_{S1}+T_{S2})$. Vectors lying in other sectors are similarly computed from base vectors.

In general, a vector at an angle $\Phi$ is generated by resolving into component vectors parallel to adjacent base vectors $S_i$ and $S_{i+1}$ and having pulse widths $T_i$ and $T_{i+1}$, where i is an integer between one and six. Assuming base vector $S_i$ has a phase angle bit the pulse widths are computed from the following equations 1–4.

$$\Theta = \Phi - \Phi_i \quad (1)$$

$$T_i = m * T_{DRIVE} * \sin(60° - \Theta) \quad (2)$$

$$T_{i+1} = m * T_{DRIVE} * \sin(\Theta) \quad (3)$$

$$T_{NULL} = T_{DRIVE} - (T_i + T_{i+1}) \quad (4)$$

A scale factor m is used to scale pulse widths $T_i$ and $T_{i+1}$ within $T_{DRIVE}$ to adjust the power delivered to motor 101. Hence, m can be adjusted to produce a sequence for idling motor 101. The value of m is between zero and one.

FIG. 5 is a timing diagram showing drive pulses of $V_{151}$–$V_{155}$ over two successive $T_{DRIVE}$ time periods of an alternating $S_7$ null sequence, where $T_5$–$T_0$=$T_{10}$–$T_5$=$T_{DRIVE}$. $T_5$ corresponds to an angle of 60° to show the alternation of null vectors $S_7$ and $S_0$.

The interval $T_0$–$T_5$ lies in the 0°–60° sector, so pulse generator 119 uses base vectors $S_1$ and $S_2$ to compute pulse widths for $V_{151}$–$V_{155}$ from equations 1–4. The $V_{151}$–$V_{155}$ pulses are center-aligned within $T_0$–$T_5$ around midpoint $T_C$ to minimize the amount of simultaneous switching of drivers 111–115, which reduces system noise and harmonic jitter. Hence, one-half of $S_2$ is generated during $T_1$–$T_2$ and the other half during $T_3$–$T_4$. Similarly, one-half of $S_7$ is generated during $T_0$–$T_1$ and the other half during $T_4$–$T_5$. $S_1$ is generated during $T_2$–$T_3$. This vector sequence is used for all $T_{DRIVE}$ time periods in the 0°–60° sector, which lies within interval $TP_1$–$TP_2$ of FIG. 2 where $I_{131}$ is near peak levels. Note that $V_{151}$ is not switched during this period, but instead remains at a constant voltage $V_{DRIVE}$. Pulse widths are varied in accordance with equations 1–4 to advance the phase angle through the sector.

The time period $T_5$–$T_{10}$ occurs in the 60°–120° sector, and uses base vectors $S_2$ and $S_3$ to compute pulse widths of $V_{151}$–$V_{155}$ from equations 1–4. $V_{151}$–$V_{155}$ are center-aligned as described above. Base vector $S_2$ is produced during $T_5$–$T_6$, $S_3$ during $T_6$–$T_7$, null vector $S_0$ during $T_7$–$T_8$, $S_3$ during $T_8$–$T_9$ and $S_2$ during $T_9$–$T_{10}$. Note that null vector $S_0$ is used in the 60°–120° sector, rather than $S_7$ as in the 0°60° sector.

Table 2 below shows vector angles, base vector sequences, and drive pulse sequences for the sectors.

TABLE 2

| Sector | Phase Angle | Vector Sequence | $(V_{151}V_{153}V_{155})$ Drive Pulse Sequence |
| --- | --- | --- | --- |
| 1 | 0°–60° | $S_7S_2S_1S_2S_7$ | 111,110,100,110,111 |
| 2 | 60°–120° | $S_2S_3S_0S_3S_2$ | 110,010,000,010,110 |
| 3 | 120°–180° | $S_7S_4S_3S_4S_7$ | 111,011,010,011,111 |
| 4 | 180°–240° | $S_4S_5S_0S_5S_4$ | 011,001,000,001,011 |
| 5 | 240°–300° | $S_7S_6S_5S_6S_7$ | 111,101,001,101,111 |
| 6 | 300°–360° | $S_6S_5S_0S_5S_6$ | 101,100,000,100,101 |

Note that the null vector alternates between $S_7$ and $S_0$ in adjacent sectors. In other words, sectors 1, 3 and 5 use null vector $S_7$, whereas sectors 2, 4 and 6 use null vector $S_0$. During motoring, when the coil currents lag the voltage envelope at nodes 151–155, an alternating null sequence beginning with $S_7$ has the advantage of minimizing switching transitions and power consumption when coil currents are at or near their peaks.

FIG. 6 is a timing diagram showing the relationship between drive vectors and drive pulses $V_{151}$–$V_{155}$ over two successive $T_{DRIVE}$ time periods of an alternating $S_0$ null sequence, where $T_5$–$T_0$=$T_{10}$–$T_5$=$T_{DRIVE}$. $T_5$ corresponds to a 60° phase angle to show the alternation of null vectors $S_0$ and $S_7$. From $T_0$ to $T_5$, base vectors $S_1$ and $S_2$ and null vector $S_0$ are used to compute $V_{151}$–$V_{155}$. From $T_5$ to $T_{10}$, base vectors $S_2$ and $S_3$ and null vector $S_7$ are used.

The pulse widths of $V_{151}$–$V_{155}$ are computed by pulse generator 119 using equations 1–4 above, and then center-aligned within the period $T_0$–$T_5$ around midpoint $T_C$ to minimize simultaneous switching. Hence, base vector $S_2$ is generated from $T_0$–$T_1$, $S_1$ is generated from $T_1$–$T_2$, null vector $S_0$ is generated from $T_2$–$T_3$, $S_1$ from $T_3$–$T_4$, and $S_2$ from $T_4$–$T_5$. This sequence is repeated in the other $T_{DRIVE}$ time periods within the 0°–60° sector, which lies within the interval $TP_5$ to $TP_6$ of FIG. 4 where $I_{131}$ is near its peak levels. As can be seen, $V_{151}$ is not switched during this period, but instead remains at a constant ground potential throughout the 0°–60° sector.

Time period $T_5T_{10}$ occurs in the 60°–120° sector and uses $S_2$ and $S_3$ to compute pulse widths of $V_{151}$–$V_{155}$ from equations 1–4. To reduce simultaneous switching, $V_{151}$–$V_{155}$ are center-aligned. Hence, null vector $S_7$ is generated during $T_5$–$T_6$, base vector $S_2$ during $T_6$–$T_7$, $S_3$ from $T_7$–$T_8$, $S_2$ from $T_8$ to $T_9$ and null vector $S_7$ during $T_9$–$T_{10}$. Note that null vector $S_7$ is used in the 60°–120° sector, whereas $S_0$ is used in the 0°–60° sector.

The complete alternating null $S_0$ sequence for each sector in a cycle of motor 101 is shown in Table 3 below.

TABLE 3

| Sector | Phase Angle | Vector Sequence | $(V_{151}V_{153}V_{155})$ Drive Pulse Sequence |
| --- | --- | --- | --- |
| 1 | 0°–60° | $S_2S_1S_0S_1S_2$ | 110,100,000,100,110 |
| 2 | 60°–120° | $S_7S_3S_2S_3S_7$ | 111,010,110,010,110 |
| 3 | 120°–180° | $S_4S_3S_0S_3S_4$ | 011,010,000,010,011 |
| 4 | 180°–240° | $S_7S_4S_5S_4S_7$ | 111,011,001,011,111 |
| 5 | 240°–300° | $S_6S_5S_0S_5S_6$ | 101,001,000,001,101 |
| 6 | 300°–360° | $S_7S_6S_1S_6S_7$ | 111,101,100,101,111 |

Note that sectors 1, 3 and 5 use null vector $S_0$, whereas sectors 2, 4 and 6 use null vector $S_7$. During regenerating, when the coil currents effectively lead in phase, the alternating null $S_0$ sequence has the advantage of minimizing driver switching and power consumption when coil currents are at or near their peaks.

By now it should be appreciated that the present invention provides an electric motor drive circuit and method which improves performance by adapting to changes in the operating conditions of the motor. A pulse generator drives the electric motor with a sequence of drive pulses over a series of time periods. The pulse widths of the drive pulses are varied to represent phases of the electric motor. A physical state of the motor, such as its power factor or temperature, is monitored by a sensor to produce a representative control signal. When the electric motor is configured to operate either as a motor supplying power to a load or as a generator which receives power from the load, a physical state such as the motor's power factor can be used to generate one sequence of drive pulses while the motor is motoring and to switch to another sequence when the motor is regenerating. When the physical state changes, the pulse generator responds to the control signal by switching to another sequence of drive pulses to drive the motor.

What is claimed is:

1. A method for operating an electric motor, comprising the steps of:

generating a first sequence of drive pulses using a Space Vector Modulation (SVM) technique;

generating a second sequence of drive pulses; and switching from the first sequence of drive pulses to the second sequence of drive pulses to operate the electric motor in response to a control signal representative of a physical state of the electric motor.

2. The method of claim 1, further comprising the step of sensing a coil current through a coil of the electric motor to produce the control signal.

3. The method of claim 2, wherein the step of sensing includes sensing a phase angle between the coil current through the coil and a voltage across the coil.

4. The method of claim 3, further comprising the step of computing a phase of the coil current from a coil voltage.

5. The method of claim 4, further comprising the steps of:

driving a coil of the electric motor with the first sequence of drive pulses when the phase of the coil current has a first value; and driving the coil with the second sequence of drive pulses when the phase of the coil current has a second value.

6. The method of claim 5, wherein the coil current has the first value when the electric motor is motoring and the second value when the electric motor is regenerating.

7. The method of claim 1, further comprising the step of sensing a temperature of the electric motor to produce the control signal.

8. The method of claim 1, wherein the first commutation sequence is generated using a Space Vector Modulation (SVM) technique.

9. The method of claim 1, wherein the step of switching includes the steps of:

operating the electric motor using the first sequence of drive pulses when the control signal indicates that the electric motor is motoring; and operating the electric motor using the second sequence of drive pulses when the control signal indicates that the electric motor is regenerating.

10. The method of claim 1, wherein the control signal is representative of a temperature of the electric motor.

11. The method of claim 1, further including the step of applying the first sequence of drive pulses to coils of the electric motor for orienting a rotor of the electric motor to a first phase angle range.

12. A method for increasing efficiency of an electric motor, comprising the steps of:

generating a first ordered sequence of variable width voltage pulses to produce a first voltage envelope, wherein coil currents are generated in coils of the electric motor in response to the variable width voltage pulses to generate an electromagnetic force that drives a rotor of the electric motor, wherein a portion of the first voltage envelope remains at a constant voltage when a first coil current reaches a peak current level;

generating a second ordered sequence of variable width voltage pulses to produce a second voltage envelope;

monitoring a control coil current of the electric motor;

operating the electric motor using the first ordered sequence when a phase of the control coil current has a first value; and operating the electric motor using the second ordered sequence when the phase of the control coil current has a second value.

13. The method of claim 12, wherein the phase of the control coil current has the first value when the electric motor is motoring.

14. The method of claim 12, wherein the phase of the control coil current has the second value when the electric motor is regenerating.

15. The method of claim 12, wherein the first ordered sequence of variable width voltage pulses is generated using a Space Vector Modulation (SVM) technique.

* * * * *